(12) United States Patent
Phillips et al.

(10) Patent No.: US 9,631,703 B2
(45) Date of Patent: Apr. 25, 2017

(54) MULTI-SPEED TRANSMISSION

(75) Inventors: Andrew W. Phillips, Rochester, MI (US); Scott H. Wittkopp, Ypsilanti, MI (US); Clinton E. Carey, Highland, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/447,938

(22) Filed: Apr. 16, 2012

(65) Prior Publication Data

US 2012/0202638 A1    Aug. 9, 2012

Related U.S. Application Data

(62) Division of application No. 12/059,270, filed on Mar. 31, 2008, now Pat. No. 8,157,695.

(51) Int. Cl.
*F16H 3/66* (2006.01)

(52) U.S. Cl.
CPC ............. *F16H 3/66* (2013.01); *F16H 3/666* (2013.01); *F16H 2200/006* (2013.01); *F16H 2200/2012* (2013.01); *F16H 2200/2043* (2013.01)

(58) Field of Classification Search
CPC .... F16H 3/66; F16H 3/666; F16H 2200/2012; F16H 2200/2043; F16H 2200/006
See application file for complete search history.

(56) References Cited

U.S. PATENT DOCUMENTS

| | | | | |
|---|---|---|---|---|
| 4,531,428 | A * | 7/1985 | Windish | 475/279 |
| 4,683,776 | A * | 8/1987 | Klemen | 475/286 |
| 6,176,803 | B1 | 1/2001 | Meyer et al. | |
| 6,558,287 | B2 | 5/2003 | Hayabuchi et al. | |
| 6,955,627 | B2 | 10/2005 | Thomas et al. | |
| 6,960,149 | B2 | 11/2005 | Ziemer | |
| 6,976,930 | B2 | 12/2005 | Winzeler | |
| 6,984,187 | B2 | 1/2006 | Biermann | |
| 6,991,578 | B2 | 1/2006 | Ziemer | |
| 7,011,597 | B2 | 3/2006 | Haka | |
| 7,018,319 | B2 | 3/2006 | Ziemer | |
| 7,101,305 | B2 | 9/2006 | Tabata et al. | |
| 7,163,484 | B2 | 1/2007 | Klemen | |
| 7,670,247 | B2 * | 3/2010 | Phillips et al. | 475/275 |
| 7,695,394 | B2 * | 4/2010 | Phillips et al. | 475/275 |
| 7,722,496 | B2 * | 5/2010 | Phillips et al. | 475/276 |
| 7,736,263 | B2 * | 6/2010 | Phillips et al. | 475/277 |
| 7,753,819 | B2 * | 7/2010 | Phillips et al. | 475/275 |
| 7,753,820 | B2 | 7/2010 | Phillips et al. | |
| 7,785,226 | B2 | 8/2010 | Phillips et al. | |
| 7,794,351 | B2 | 9/2010 | Wittkopp et al. | |
| 7,794,352 | B2 | 9/2010 | Hart et al. | |

(Continued)

FOREIGN PATENT DOCUMENTS

DE    102004040904 A1    3/2006

*Primary Examiner* — Erin D Bishop

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices may include clutches and brakes and are selectively engageable in combinations of at least two to establish at least eight forward speed ratios and at least one reverse speed ratio between the input member and the output member.

17 Claims, 3 Drawing Sheets

(56) References Cited

U.S. PATENT DOCUMENTS

| | | |
|---|---|---|
| 7,803,083 B2 | 9/2010 | Carey et al. |
| 7,824,297 B2 | 11/2010 | Carey et al. |
| 7,824,300 B2 | 11/2010 | Wittkopp et al. |
| 7,985,161 B2 * | 7/2011 | Wittkopp et al. ............. 475/311 |
| 8,007,397 B2 * | 8/2011 | Phillips et al. ............... 475/277 |
| 8,047,948 B2 * | 11/2011 | Phillips et al. ............... 475/275 |
| 8,105,198 B2 * | 1/2012 | Hart et al. .................... 475/286 |
| 8,152,684 B2 * | 4/2012 | Wittkopp et al. ............. 475/311 |
| 8,157,695 B2 * | 4/2012 | Phillips et al. ............... 475/275 |
| 8,162,792 B2 * | 4/2012 | Phillips et al. ............... 475/280 |
| 8,197,377 B2 * | 6/2012 | Hart et al. .................... 475/286 |
| 8,226,521 B2 * | 7/2012 | Wittkopp et al. ............. 475/284 |
| 2005/0090362 A1 | 4/2005 | Abe et al. |
| 2006/0270513 A1 | 11/2006 | Klemen |
| 2006/0270516 A1 | 11/2006 | Klemen |
| 2008/0261765 A1 | 10/2008 | Phillips et al. |
| 2008/0305915 A1 | 12/2008 | Phillips et al. |
| 2009/0215571 A1 | 8/2009 | Carey et al. |
| 2010/0240488 A1 | 9/2010 | Carey et al. |
| 2011/0177908 A1 * | 7/2011 | Wittkopp et al. ............. 475/271 |
| 2012/0065020 A1 * | 3/2012 | Mellet et al. ................. 475/275 |
| 2012/0149524 A1 * | 6/2012 | Phillips et al. ............... 475/271 |

* cited by examiner

| GEAR STATE | GEAR RATIO | RATIO STEP | TORQUE TRANSMITTING ELEMENTS | | | | |
|---|---|---|---|---|---|---|---|
| | | | 34 | 30 | 32 | 28 | 26 |
| REV | -4.455 | | X | | | | X |
| N | | -0.65 | O | | | | |
| 1st | 6.854 | | X | | | X | |
| 2nd | 4.336 | 1.58 | X | | X | | |
| 3rd | 3.306 | 1.31 | | | X | X | |
| 4th | 2.248 | 1.47 | | | X | | X |
| 5th | 1.976 | 1.14 | | X | X | | |
| 6th | 1.572 | 1.26 | | X | | | X |
| 7th | 1.340 | 1.17 | | X | | X | |
| 8th | 1.000 | 1.34 | | | | X | X |

X = ON, CARRYING TORQUE
O = ON, NOT CARRYING TORQUE

| GEAR STATE | GEAR RATIO | RATIO STEP | TORQUE TRANSMITTING ELEMENTS | | | | |
|---|---|---|---|---|---|---|---|
| | | | 132 | 130 | 134 | 128 | 126 |
| REV | -2.333 | | | X | | | X |
| N | | -0.71 | | O | | | |
| 1st | 3.267 | | | X | X | | |
| 2nd | 2.333 | 1.40 | | X | | X | |
| 3rd | 1.667 | 1.40 | | | X | X | |
| 4th | 1.000 | 1.67 | | | | X | X |
| 5th | 0.815 | 1.23 | X | | | X | |
| 6th | 0.638 | 1.28 | X | | | | X |
| 7th | 0.597 | 1.07 | X | | X | | |
| 8th | 0.524 | 1.14 | | | X | | X |

X = ON, CARRYING TORQUE
O = ON, NOT CARRYING TORQUE

MULTI-SPEED TRANSMISSION

CROSS-REFERENCE TO RELATED APPLICATION

This application is a divisional of U.S. patent application Ser. No. 12/059,270 filed on Mar. 31, 2008. The disclosure of the above application is incorporated herein by reference.

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

In an embodiment of the present invention, a transmission is provided having an input member, an output member, four planetary gear sets, a plurality of coupling members and a plurality of torque transmitting devices. Each of the planetary gear sets includes first, second and third members. A first interconnecting member continuously interconnects the first member of the first planetary gear set with second member of the second planetary gear set. A second interconnecting member continuously interconnects the second member of the first planetary gear set with third member of the second planetary gear set. A third interconnecting member continuously interconnects the first member of the second planetary gear set with the second member of the third planetary gear set. A fourth interconnecting member continuously interconnects the first member of the third planetary gear set with the first member of the fourth planetary gear set. Five torque transmitting devices are selectively engageable to interconnect one of the first members, second members, and third members with at least one other of the first members, second members, third members, and a stationary member. The torque transmitting devices are selectively engageable in combinations of at least two to establish at least eight forward speed ratios and at least one reverse speed ratio between the input member and the output member.

In another embodiment of the present invention a transmission is provided having an input member, an output member, four planetary gear sets, a plurality of coupling members and a plurality of torque transmitting devices. The first, second, third and fourth planetary gear sets each having a sun gear, a carrier member and a ring gear. The input member is continuously interconnected with the sun gear of the first planetary gear set and the output member is continuously interconnected with the carrier member of the fourth planetary gear set. A first interconnecting member continuously interconnects the ring gear of the first planetary gear set with carrier member of the second planetary gear set. A second interconnecting member continuously interconnects the carrier member of the first planetary gear set with sun gear of the second planetary gear set and ring gear of the fourth planetary gear set. A third interconnecting member continuously interconnects the ring gear of the second planetary gear set with the carrier member of the third planetary gear set. A fourth interconnecting member continuously interconnects the ring gear of the third planetary gear set with the ring gear of the fourth planetary gear set. A first torque transmitting device is selectively engageable to interconnect the carrier member of the third planetary gear set with the carrier member of the fourth planetary gear set. A second torque transmitting device is selectively engageable to interconnect the carrier member of the third planetary gear set with the sun gear of the fourth planetary gear set. A third torque transmitting device is selectively engageable to interconnect the sun gear of the third planetary gear set with the stationary member. A fourth torque transmitting device is selectively engageable to interconnect the sun gear of the fourth planetary gear set with the stationary member. A fifth torque transmitting device is selectively engageable to interconnect the carrier member of the second planetary gear set with the stationary member. The torque transmitting devices are selectively engageable in combinations of at least two to establish at least eight forward speed ratios and at least one reverse speed ratio between the input member and the output member.

In yet another embodiment of the present invention a transmission is provided having an input member, an output member, four planetary gear sets, a plurality of coupling members and a plurality of torque transmitting devices. The first, second, third and fourth planetary gear sets each having a sun gear, a carrier member and a ring gear. The input member is continuously interconnected with at least one of the carrier member of the first planetary gear set and the sun gear of the second planetary gear set. The output member is continuously interconnected with the carrier member of the fourth planetary gear set. A first interconnecting member continuously interconnects the ring gear of the first planetary gear set with carrier member of the second planetary gear set. A second interconnecting member continuously interconnects the carrier member of the first planetary gear set with sun gear of the second planetary gear set. A third interconnecting member continuously interconnects the ring gear of the second planetary gear set with the carrier member of the third planetary gear set. A fourth interconnecting member continuously interconnects the ring gear of the first planetary gear set with the ring gear of the third planetary gear set and the ring gear of the fourth planetary gear set. The first torque transmitting device is selectively engageable to interconnect the carrier member of the fourth planetary gear set with the sun gear of the third planetary gear set. The second torque transmitting device is selectively engageable to interconnect the sun gear of the fourth planetary gear set with the sun gear of the third planetary gear set. The third torque transmitting device is selectively engageable to interconnect the ring gear of the second planetary gear set with the stationary member. The fourth torque transmitting device is selectively engageable to interconnect the sun gear of the first planetary gear set with the stationary member. The fifth torque transmitting device is selectively engageable to interconnect the sun gear of the fourth planetary gear set with the stationary member. The torque transmitting devices are selectively engageable in combinations of at least two to establish at least eight forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the eight speed automatic transmission of the present invention have an arrangement of permanent mechanical connections between the elements of the four planetary gear sets in common. These mechanical connections generically link or relate the transmission embodiments. A first component or element of a first planetary gear set is permanently coupled to a second component or element of a second planetary gear set. A second component or element of the first planetary gear set is permanently coupled to a third component or element of a second planetary gear set. A first component or element of the second planetary gear set is permanently coupled to a second component or element of a third planetary gear set. A first component or element of the third planetary gear set is permanently coupled to a first component or element of a fourth planetary gear set.

Figure 1:
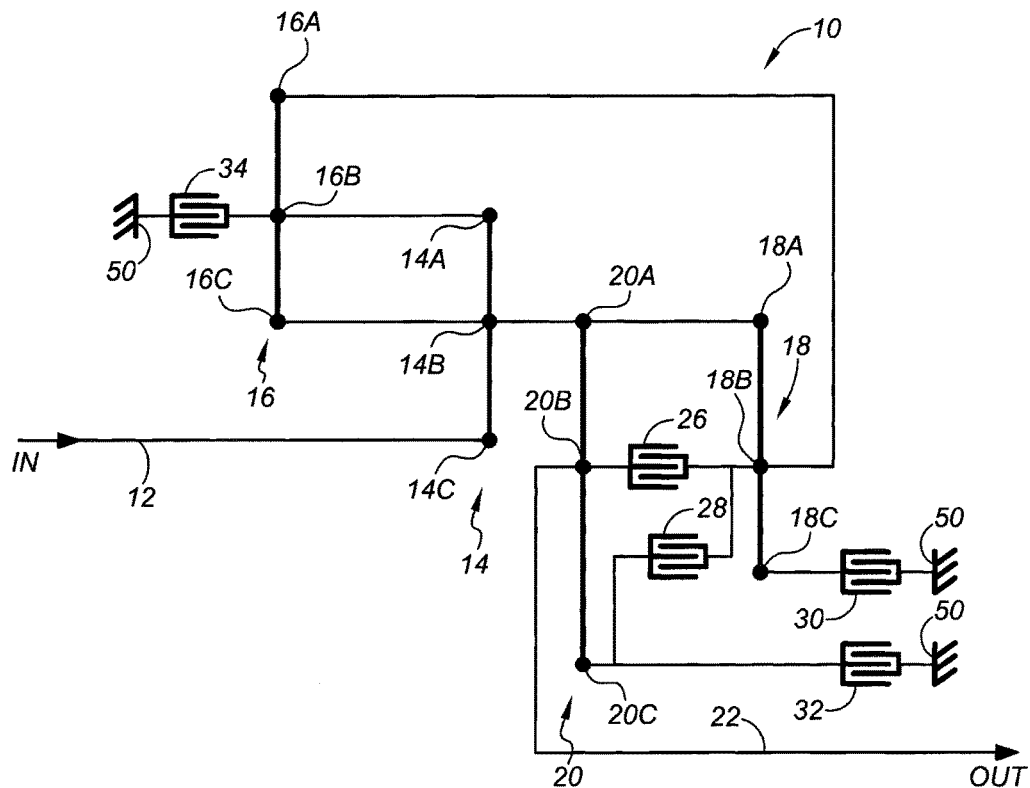
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input 12 is coupled to the third node 14C of the first planetary gear set. The output 22 is coupled to the second node 20B of the fourth planetary gear set 20. The first node 14A of the first planetary gear set 14 is coupled to the second node 16B of the second planetary gear set 16. The second node 14B of the first planetary gear set 14 is coupled to the third node 16C of the second planetary gear set 16 and to a first node 20A of the fourth planetary gear set 20. The first node 16A of the second planetary gear set 16 is coupled to the second node 18B of the third planetary gear set 18. The first node 18A of the third planetary gear set 18 is coupled to a first node 20A of the fourth planetary gear set 20.

A first clutch 26 selectively connects the second node 18B of the third planetary gear set 18 to the second node 20B of the fourth planetary gear set 20. A second clutch 28 selectively connects the second node 18B of the third planetary gear set 18 to the third node 20C of the fourth planetary gear set 20. A first brake 30 selectively connects the third node 18C of the third planetary gear set 18 to the ground or transmission housing 50. A second brake 32 selectively connects the third node 20C of the fourth planetary gear set 20 to the ground or transmission housing 50. A third brake 34 selectively connects the second node 16B of the second planetary gear set 16 to the ground or transmission housing 50.

Figure 2:
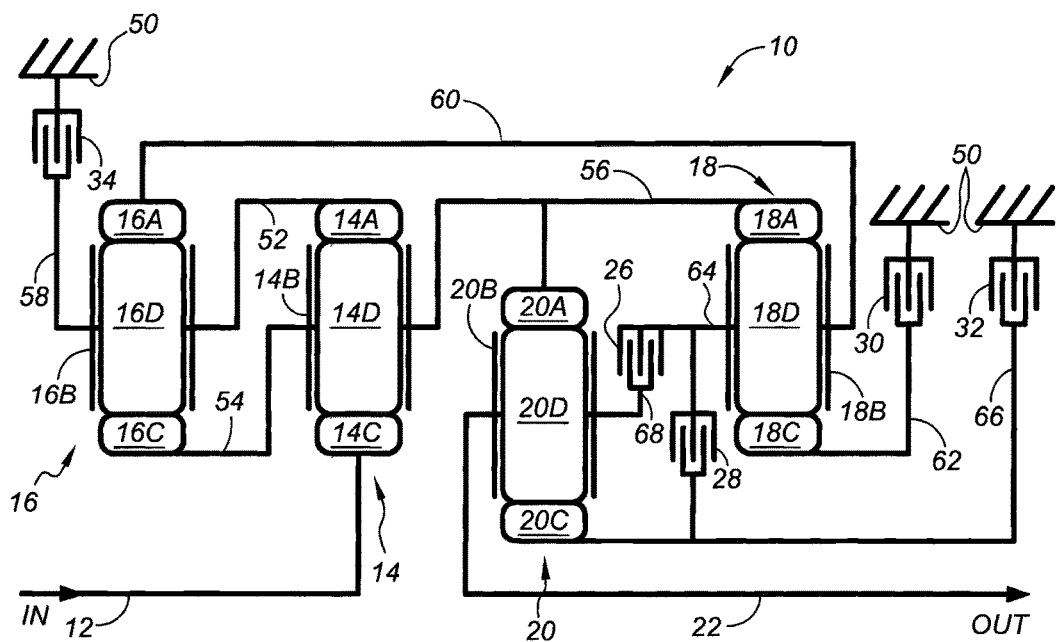
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gears, ring gears, planet gears and planet gear carriers.

For example, planetary gear set 14 is a planetary gear set that includes a sun gear member 14C, a planet gear carrier member 14B and a ring gear member 14A. Sun gear member 14C is connected for common rotation with input shaft or member 12. Ring gear member 14A is connected to a first interconnecting shaft or member 52. The planet gear carrier member 14B rotatably supports a set of planet gears 14D (only one shown) and is connected for common rotation with a second interconnecting shaft or member 54 and a third interconnecting shaft or member 56. Planet gears 14D are configured to intermesh with sun gear member 14C and ring gear member 14A.

The input shaft or member 12 is continuously connected to an engine (not shown) or to a turbine of a torque converter (not shown). The output shaft or member 22 is continuously connected with the final drive unit or transfer case (not shown).

Planetary gear set 16 is a planetary gear set that includes a sun gear member 16C, a planet carrier member 16B that rotatably supports a set of planet gears 16D and a ring gear member 16A. Sun gear member 16C is connected for common rotation with the second interconnecting shaft or member 54. Planet carrier member 16B is connected for common rotation with first interconnecting shaft or member 52 and a first outer shaft or member 58. Ring gear member 16A is connected for common rotation with a fourth interconnecting shaft or member 60. Planet gears 16D are configured to intermesh with both sun gear member 16C and ring gear member 16A.

Planetary gear set 18 is a planetary gear set that includes a sun gear member 18C, a ring gear member 18A and a planet carrier member 18B that rotatably supports a set of planet gears 18D. Sun gear member 18C is connected for common rotation with a second outer shaft or member 62. Ring gear member 18A is connected for common rotation with the third interconnecting shaft or member 56. Planet carrier member 18B is connected for common rotation with fourth interconnecting shaft or member 60 and a fifth interconnecting shaft or member 64. Planet gears 18D are configured to intermesh with both sun gear member 18C and ring gear member 18A.

Planetary gear set 20 is a planetary gear set that includes a sun gear member 20C, a ring gear member 20A and a planet carrier member 20B that rotatably supports a set of planet gears 20D. Sun gear member 20C is connected for common rotation with a sixth interconnecting shaft or member 66. Ring gear member 20B is connected for common rotation with third interconnecting shaft or member 56. Planet carrier member 20B is connected for common rotation with a seventh interconnecting shaft or member 68 and output shaft or member 22. Planet gears 20D are configured to intermesh with both sun gear member 20C and ring gear member 20A.

The torque-transmitting mechanisms or clutches 26, 28 and brakes 30, 32 and 34 allow for selective interconnection of the shafts or interconnecting members, members of the planetary gear sets and the housing. For example, the first clutch 26 is selectively engageable to connect the fifth interconnecting shaft or member 64 to the seventh interconnecting shaft or member 68. The second clutch 28 is selectively engageable to connect the fifth interconnecting member 64 to the sixth interconnecting shaft or member 66. The first brake 30 is selectively engageable to connect second outer shaft or member 62 to the ground or transmission housing 50 to restrict rotation of the member 62 relative to the housing 50. The second brake 32 is selectively engageable to connect sixth interconnecting shaft or member 66 to the ground or transmission housing 50 to restrict rotation of the member 66 relative to the housing 50. The third brake 34 is selectively engageable to connect the first outer shaft or member 58 to the ground or transmission housing 50 to restrict rotation of the member 58 relative to the housing 50.

Figures 3, 4:
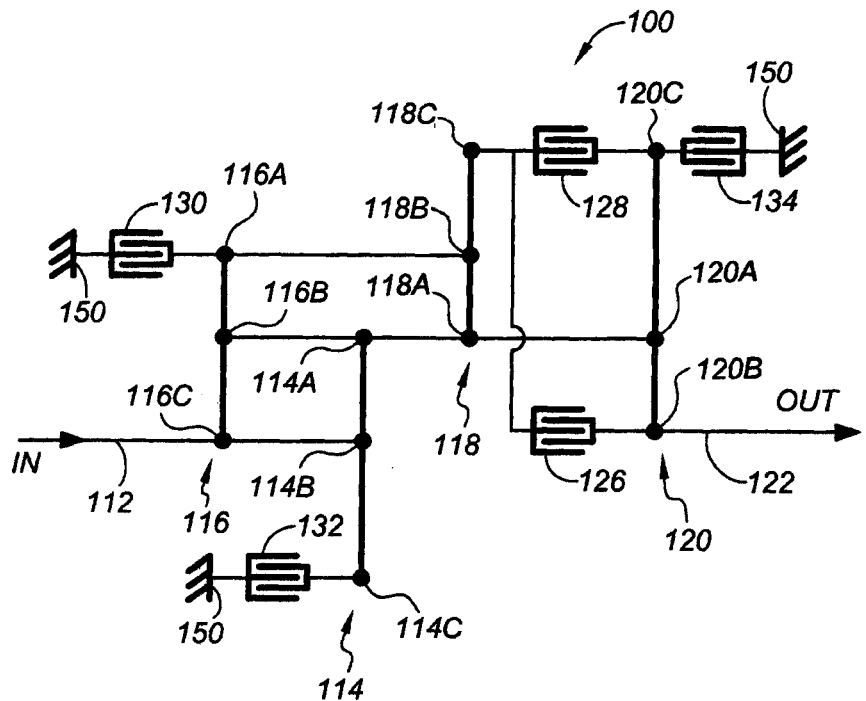
FIG. 3 is a truth table presenting the state of engagement of the various torque transmitting clutches and brakes in each of the available forward and reverse speeds or gear ratios of the transmission illustrated in FIGS. 1 and 2.
FIG. 4 is a lever diagram of another embodiment of an eight speed transmission according to the present invention.

Referring now to FIGS. 2 and 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, and third brake 34), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first clutch 26 and the third brake 34 are engaged or activated. The first clutch 26 connects the fifth interconnecting shaft or member 64 to the seventh interconnecting shaft or member 68. The third brake 34 connects the first outer shaft or member 58 to the ground or transmission housing 50 to restrict rotation of the member 58 relative to the housing 50.

Likewise, the eight forward ratios are achieved through different combinations of clutch engagement, as shown in FIG. 3.

It will be appreciated that the foregoing explanation of operation and gear states of the eight speed transmission 10 assumes, first of all, that all the clutches and the brake not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 4, another embodiment of a transmission is illustrated and referenced by reference numeral 100. Transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122.

The input 112 is coupled to the third node 116C of the first planetary gear set 116. The output 122 is coupled to the second node 120B of the fourth planetary gear set 120. The first node 114A of the first planetary gear set 114 is coupled to the second node 116B of the second planetary gear set 116 and to the first node 118A of the third planetary gear set 118. The second node 114B of the first planetary gear set 114 is coupled to the third node 116C of the second planetary gear set 116. The first node 116A of the second planetary gear set 116 is coupled to the second node 118B of the third planetary gear set 118. The first node 118A of the third planetary gear set 118 is coupled to a first node 120A of the fourth planetary gear set 120.

A first clutch 126 selectively connects the third node 118C of the third planetary gear set 118 to the second node 120B of the fourth planetary gear set 120. A second clutch 128 selectively connects the third node 118C of the third planetary gear set 118 to the third node 120C of the fourth planetary gear set 120. A first brake 130 selectively connects the first node 116A of the second planetary gear set 116 to the ground or transmission housing 150. A second brake 132 selectively connects the third node 114C of the first planetary gear set 114 to the ground or transmission housing 150. A third brake 134 selectively connects the third node 120C of the fourth planetary gear set 120 to the ground or transmission housing 150.

Figures 5, 6:
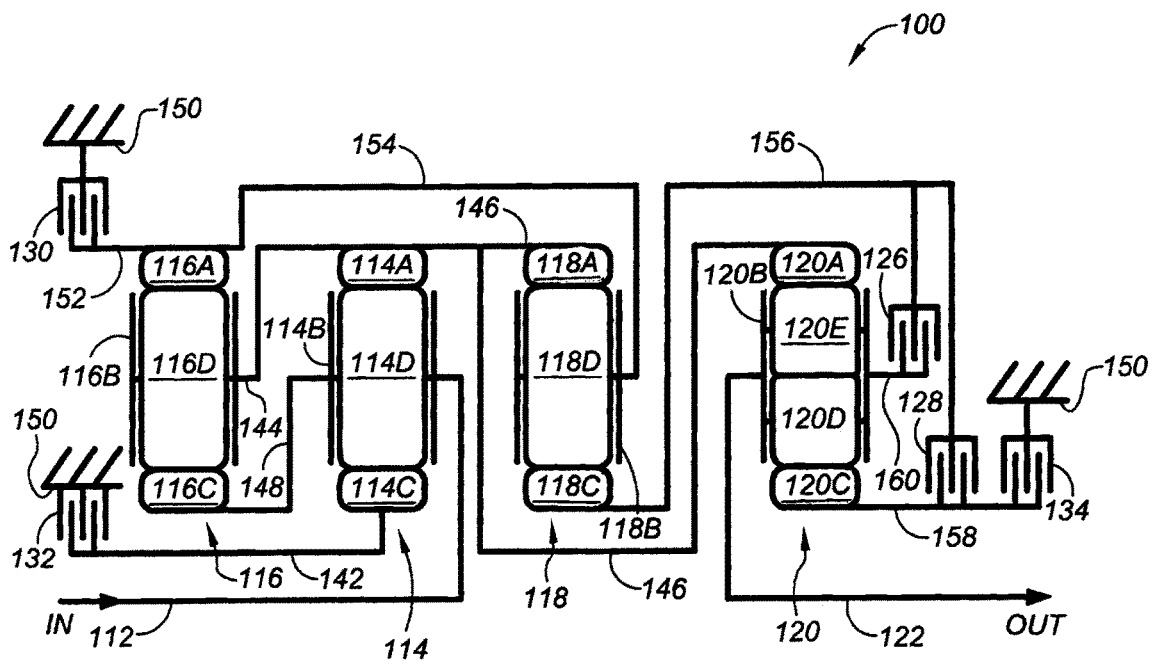
FIG. 5 is a diagrammatic view of another embodiment of an eight speed transmission according to the present invention.
FIG. 6 is a truth table presenting the state of engagement of the various torque transmitting clutches and brakes in each of the available forward and reverse speeds or gear ratios of the transmission illustrated in FIGS. 4 and 5.

Referring now to FIG. 5, a stick diagram presents a schematic layout of the embodiment of the eight speed transmission 100 according to the present invention. In FIG. 5, the numbering from the lever diagram of FIG. 4 is carried over. The clutches, brakes and couplings are correspondingly presented whereas the nodes of the planetary gear sets now appear as components of planetary gear sets such as sun gears, ring gears, planet gears and planet gear carriers.

For example, planetary gear set 114 is a planetary gear set that includes a sun gear member 114C, a planet gear carrier member 114B and a ring gear member 114A. Sun gear member 114C is connected for common rotation with a first interconnecting shaft or member 142. Ring gear member 114A is connected to a second interconnecting shaft or member 144 and a third interconnecting shaft or member 146. The planet gear carrier member 114B rotatably supports a set of planet gears 114D (only one shown) and is connected for common rotation with a fourth interconnecting shaft or member 148 and the input shaft or member 112. Planet gears 114D are configured to intermesh with sun gear member 114C and ring gear member 114A.

The input shaft or member 112 is continuously connected to an engine (not shown) or to a turbine of a torque converter (not shown). The output shaft or member 122 is continuously connected with the final drive unit or transfer case (not shown).

Planetary gear set 116 is a planetary gear set that includes a sun gear member 116C, a planet carrier member 116B that rotatably supports a set of planet gears 116D and a ring gear member 116A. Sun gear member 116C is connected for common rotation with the fourth interconnecting shaft or member 148. Planet carrier member 116B is connected for common rotation with second interconnecting shaft or member 144. Ring gear member 116A is connected for common rotation with a fifth interconnecting shaft or member 152 and a sixth interconnecting shaft or member 154. Planet gears 116D are configured to intermesh with both sun gear member 116C and ring gear member 116A.

Planetary gear set 118 is a planetary gear set that includes a sun gear member 118C, a ring gear member 118A and a planet carrier member 118B that rotatably supports a set of planet gears 118D. Sun gear member 118C is connected for common rotation with a seventh interconnecting shaft or member 156. Ring gear member 118A is connected for common rotation with third interconnecting shaft or member 146. Planet carrier member 118B is connected for common rotation with sixth interconnecting shaft or member 154. Planet gears 118D are configured to intermesh with both sun gear member 118C and ring gear member 118A.

Planetary gear set 120 is a planetary gear set that includes a sun gear member 120C, a ring gear member 120A and a planet carrier member 120B that rotatably supports a first set of planet gears 120D and a second set of planet gears 120E. Sun gear member 120C is connected for common rotation with an eighth interconnecting shaft or member 158. Ring gear member 120A is connected for common rotation with the third interconnecting shaft or member 146. Planet carrier member 120B is connected for common rotation with a ninth interconnecting shaft or member 160 and output shaft or member 122. The first planet gears 120D are configured to intermesh with the sun gear member 120C and the second planet gears 120E are configured to intermesh with the ring gear member 120A. The first and second planet gears 120D and 120E are configured to intermesh with one another.

The torque-transmitting mechanisms or clutches 126, 128 and brakes 130, 132 and 134 allow for selective interconnection of the shafts or interconnecting members, members of the planetary gear sets and the housing 150. For example, the first clutch 126 is selectively engageable to connect the seventh interconnecting shaft or member 156 to the ninth interconnecting shaft or member 160. The second clutch 128 is selectively engageable to connect the seventh interconnecting shaft or member 156 to eighth interconnecting shaft or member 158. The first brake 130 is selectively engageable to connect the fifth interconnecting shaft or member 152 to the ground or housing 150 to restrict rotation of the member 152 relative to the ground or housing 150. The second brake 132 is selectively engageable to connect the first interconnecting shaft or member 142 to the ground or housing 150 to restrict rotation of the member 142 relative to the ground or housing 150. The third brake 134 is selectively engageable to connect the eighth interconnecting member 158 to the ground or housing 150 to restrict rotation of the eighth interconnecting member 158 relative to the ground or housing 150.

Referring now to FIGS. 5 and 6, the operation of the embodiment of the eight speed transmission 100 will be described. It will be appreciated that the transmission 100 is capable of transmitting torque from the input shaft or member 112 to the output shaft or member 122 in at least eight forward speeds or torque ratios and at least one reverse speed or torque ratio. Each forward and reverse speed or torque ratio is attained by engagement of one or more of the torque-transmitting mechanisms (i.e. first clutch 126, second clutch 128, first brake 130, second brake 132 and third brake 134), as will be explained below. FIG. 6 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish reverse gear, the first clutch 126 and the first brake 130 are engaged or activated. The first clutch 126 connects the seventh interconnecting shaft or member 156 to the ninth interconnecting shaft or member 160. The first brake 130 connects the fifth interconnecting shaft or member 152 to the ground or housing 150 to restrict rotation of the member 152 relative to the ground or housing 150.

Likewise, the eight forward ratios are achieved through different combinations of clutch and brake engagement, as shown in FIG. 6.

It will be appreciated that the foregoing explanation of operation and gear states of the eight speed transmission 100 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a first interconnecting member continuously interconnecting the first member of the first planetary gear set with the second member of the second planetary gear set;
   a second interconnecting member continuously interconnecting the second member of the first planetary gear set with the third member of the second planetary gear set;
   a third interconnecting member continuously interconnecting the first member of the second planetary gear set with the second member of the third planetary gear set;
   a fourth interconnecting member continuously interconnecting the first member of the third planetary gear set with the first member of the fourth planetary gear set; and
   a plurality of torque transmitting devices each selectively engageable to interconnect one of the first members, second members, and third members of the planetary gear sets with at least one other of the first members, second members, third members of the planetary gear sets, or a stationary member; and
   wherein the torque transmitting devices are selectively engageable in combinations of at least two to establish at least eight forward speed ratios and at least one reverse speed ratio between the input member and the output member, and a first of the plurality of torque transmitting devices is selectively engageable to directly connect the second member of the fourth planetary gear set with the third member of the third planetary gear set, and a second of the plurality of torque transmitting devices is selectively engageable to interconnect the third member of the fourth planetary gear set with the third member of the third planetary gear set.

2. The transmission of claim 1 wherein a third of the plurality of torque transmitting devices is selectively engageable to interconnect the first member of the second planetary gear set with the stationary member.

3. The transmission of claim 2 wherein a fourth of the plurality of torque transmitting devices is selectively engageable to interconnect the third member of the first planetary gear set with the stationary member.

4. The transmission of claim 3 wherein a fifth of the plurality of torque transmitting devices is selectively engageable to interconnect the third member of the fourth planetary gear set with the stationary member.

5. The transmission of claim 4 wherein the stationary member is a transmission housing.

6. The transmission of claim 1 wherein the input member is continuously interconnected with the second member of the first planetary gear set and the third member of the second planetary gear set, and the output member is continuously interconnected with the second member of the fourth planetary gear set.

7. A transmission comprising:
   an input member;
   an output member;
   first, second, third and fourth planetary gear sets each having first, second and third members;
   a plurality of interconnecting members each continuously interconnecting one of the first, second, and third members of the planetary gear sets with another one of the first, second, and third members of the planetary gear sets;
   a first torque transmitting device selectively engageable to directly connect the second member of the fourth planetary gear set with the third member of the third planetary gear set;
   a second torque transmitting device selectively engageable to interconnect the third member of the fourth planetary gear set with the third member of the third planetary gear set;
   a third torque transmitting device selectively engageable to interconnect the first member of the second planetary gear set with a stationary member;
   a fourth torque transmitting device selectively engageable to directly connect the third member of the first planetary gear set with the stationary member; and
   a fifth torque transmitting device selectively engageable to interconnect the third member of the fourth planetary gear set with the stationary member, and
   wherein the torque transmitting devices are selectively engageable in combinations of at least two to establish at least eight forward speed ratios and at least one reverse speed ratio between the input member and the output member.

8. The transmission of claim 7 wherein a first of the plurality of interconnecting members continuously interconnects the first member of the first planetary gear set with the second member of the second planetary gear set.

9. The transmission of claim 8 wherein a second of the plurality of interconnecting members continuously interconnects the second member of the first planetary gear set with the third member of the second planetary gear set.

10. The transmission of claim 9 wherein a third of the plurality of interconnecting members continuously interconnects the first member of the second planetary gear set with the second member of the third planetary gear set.

11. The transmission of claim 10 wherein a fourth of the plurality of interconnecting members continuously interconnects the first member of the first planetary gear set with the first member of the third planetary gear set and the first member of the fourth planetary gear set.

12. The transmission of claim 7 wherein the third members of the first, second, third, and fourth planetary gear set are sun gears, the second members of the first, second, third and fourth planetary gear sets are carrier members, and the first members of the first, second, third and fourth planetary gear sets are ring gears.

13. The transmission of claim 7 wherein the stationary member is a transmission housing.

14. The transmission of claim 7 wherein the input member is continuously interconnected with the second member of the first planetary gear set and the third member of the second planetary gear set, and the output member is continuously interconnected with the second member of the fourth planetary gear set.

15. A transmission comprising:
an input member;
an output member;
first, second, third and fourth planetary gear sets each having first, second and third members;
a first interconnecting member continuously interconnecting the first member of the first planetary gear set with the second member of the second planetary gear set;
a second interconnecting member continuously interconnecting the second member of the first planetary gear set with the third member of the second planetary gear set;
a third interconnecting member continuously interconnecting the first member of the second planetary gear set with the second member of the third planetary gear set;
a fourth interconnecting member continuously interconnecting the first member of the third planetary gear set with the first member of the fourth planetary gear set;
a first torque transmitting device selectively engageable to directly connect the second member of the fourth planetary gear set with the third member of the third planetary gear set;
a second torque transmitting device selectively engageable to interconnect the third member of the fourth planetary gear set with the third member of the third planetary gear set;
a third torque transmitting device selectively engageable to interconnect the first member of the second planetary gear set with a stationary member;
a fourth torque transmitting device selectively engageable to interconnect the third member of the first planetary gear set with the stationary member; and
a fifth torque transmitting device selectively engageable to interconnect the third member of the fourth planetary gear set with the stationary member, and
wherein the torque transmitting devices are selectively engageable in combinations of at least two to establish at least eight forward speed ratios and at least one reverse speed ratio between the input member and the output member.

16. The transmission of claim 15 wherein the input member is continuously interconnected with the second member of the first planetary gear set and the third member of the second planetary gear set, and the output member is continuously interconnected with the second member of the fourth planetary gear set.

17. The transmission of claim 15 wherein the third members of the first, second, third, and fourth planetary gear set are sun gears, the second members of the first, second, third and fourth planetary gear sets are carrier members, and the first members of the first, second, third and fourth planetary gear sets are ring gears.

* * * * *